US009262983B1

(12) United States Patent
Coley et al.

(10) Patent No.: US 9,262,983 B1
(45) Date of Patent: Feb. 16, 2016

(54) REAR PROJECTION SYSTEM WITH PASSIVE DISPLAY SCREEN

(75) Inventors: Christopher D. Coley, Morgan Hill, CA (US); William Thomas Weatherford, San Mateo, CA (US); Beverly L. Harrison, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 13/526,298

(22) Filed: Jun. 18, 2012

(51) Int. Cl.
*G09G 5/00* (2006.01)

(52) U.S. Cl.
CPC ........................................ *G09G 5/00* (2013.01)

(58) Field of Classification Search
CPC ......... G03B 21/12; G03B 21/26; G03B 21/38
USPC ................... 345/156–184, 659; 353/69–70
See application file for complete search history.

(56) References Cited

U.S. PATENT DOCUMENTS

| | | | |
|---|---|---|---|
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2002/0191907 | A1* | 12/2002 | Kinoshita et al. ............... 385/24 |
| 2003/0160946 | A1* | 8/2003 | Yamanaka ....................... 353/30 |
| 2005/0280784 | A1* | 12/2005 | Katase et al. ................... 353/94 |
| 2006/0010400 | A1* | 1/2006 | Dehlin et al. ................. 715/856 |
| 2006/0044282 | A1* | 3/2006 | Pinhanez et al. .............. 345/173 |
| 2008/0136796 | A1* | 6/2008 | Dowling ....................... 345/204 |
| 2010/0292886 | A1* | 11/2010 | Szczerba et al. ................ 701/29 |
| 2011/0025689 | A1* | 2/2011 | Perez et al. ................... 345/420 |
| 2012/0223885 | A1 | 9/2012 | Perez |

FOREIGN PATENT DOCUMENTS

| | | |
|---|---|---|
| JP | 2008203789 A * | 9/2008 |
| JP | 2008203789 A * | 9/2008 |
| WO | WO2011088053 | 1/2011 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

Office Action for U.S. Appl. No. 13/732,916, mailed on Aug. 14, 2014, Marason et al., "Rear Projection Screen with Infrared Transparency", 18 pages.

Reflect definition, "Reflect_Define Reflect at Dictionary.com", retrieved on Nov. 28, 2014, at <<http://dictionary.reference.com/browse/reflect>>, Dictionary.com.

Office Action for U.S. Appl. No. 13/732,916, mailed on Dec. 3, 2014, Eric G. Marason, "Rear Projection Screen with Infrared Transparency", 21 pages.

* cited by examiner

*Primary Examiner* — Charles Hicks
*Assistant Examiner* — Brent D Castiaux
(74) *Attorney, Agent, or Firm* — Lee & Hayes, PLLC

(57) ABSTRACT

Described herein are systems and techniques for projecting content, periodically or continuously, onto a rear surface of a display medium from behind. The rear projected image is presented on an opposing or front surface of the display medium to a human audience for viewing. Additionally, non-visible light (e.g., IR light) is passed through the display medium to an area in front of the medium. The non-visible light is used to detect human gestures. In this manner, the rear projection arrangement avoids viewer obstruction during projection, yet detects and recognizes gestures made by the viewer in front of the display medium.

22 Claims, 5 Drawing Sheets

REAR PROJECTION SYSTEM WITH PASSIVE DISPLAY SCREEN

BACKGROUND

Passive display screens are used to present images that are projected by a projector. For instance, home entertainment systems often use projection systems to project images onto a passive screen to provide a big screen, high quality viewing experience. The images may be projected form the front side of the screen (i.e., the side facing the viewing audience) or from the rear side (i.e., the side hidden from the viewing audience).

With front projection systems, one of the challenges that may impact viewing quality is the physical arrangement of the screen within an environment, relative to the projector, and relative to the viewer(s). Ideally, for a conventional screen, the projector should project the image from a location that is normal to a planer surface of the screen. The viewer should also have a point of view that is normal to the planer surface. But, in this arrangement, the viewer's body (e.g., head, shoulders) may intercept at least a portion of the projected image, blocking that image from reaching the screen. To avoid this unintended obstruction, projectors may be placed in front of the viewers, or from an overhead or side position. However, these placements may not help. For instance, placing the projector in front of the viewers may obstruct the view of the viewer, and moving the projector relative to a conventional screen may cause degradation in the quality of the image presented on the screen.

Rear projection systems avoid challenges caused by potential viewer obstruction, but still encounter unique challenges in that the images are projected onto the screen from behind and yet the screen needs to present high quality images in the opposing direction toward the viewing audience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
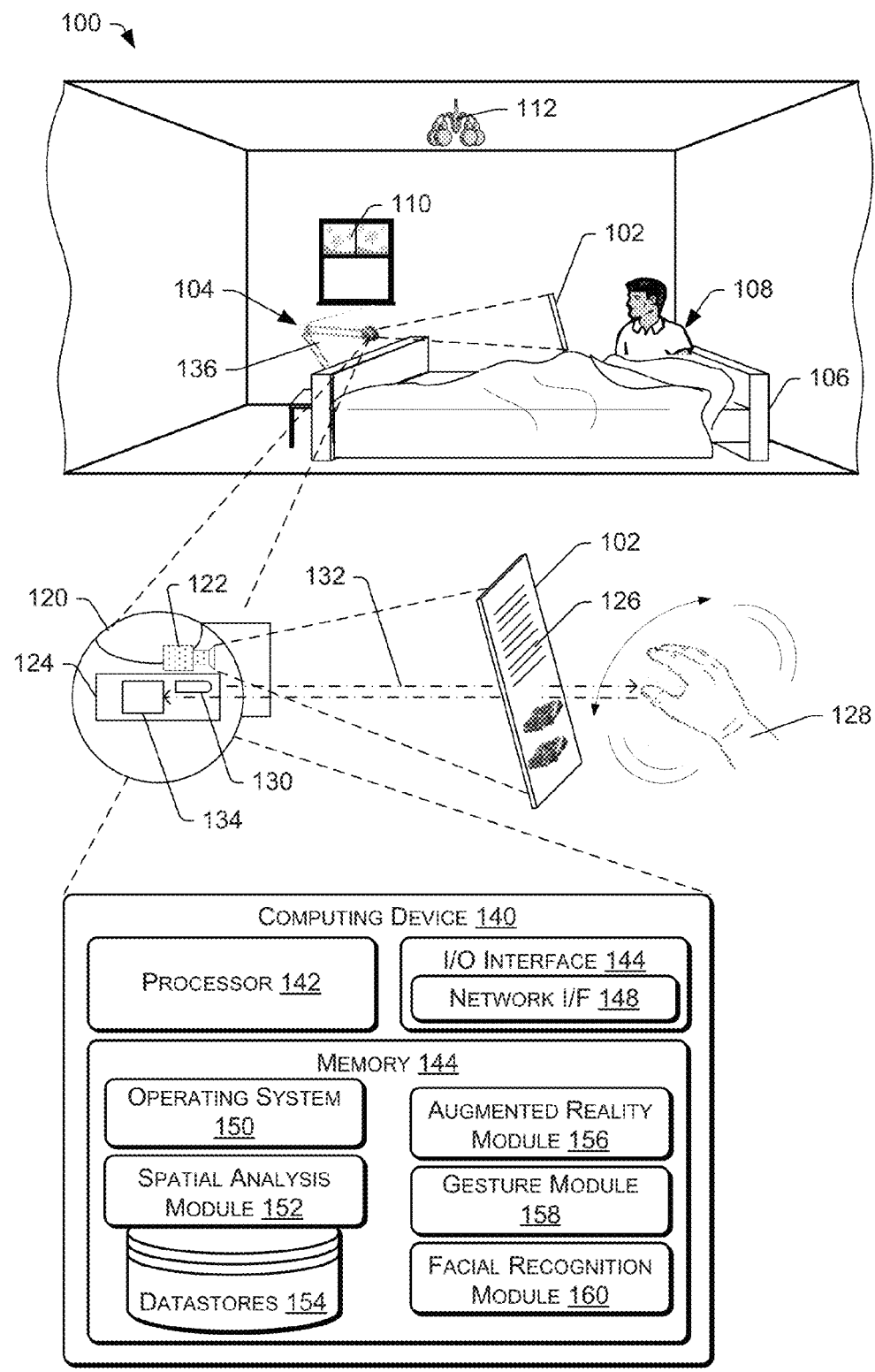
FIG. 1 shows an example environment in which a portable, rear projection, passive display screen may be used in conjunction with a projection system having gesture recognition. The screen presents an image, projected thereon from behind, to a viewer while simultaneously passing non-visible light used to detect human gestures made in front of the screen.

Projection systems are used in a variety of environments including movie theaters, conference rooms, classrooms, homes, and so forth. These projection systems include a projector configured to emit light towards a projection surface or screen. The projection screen, or display medium, is configured to accept and scatter the light such that an image is presented to viewers. The display medium may be fixed, such as one that mounts to a wall or a stand, or portable, such as a handheld projection screen.

Projecting onto a portable handheld projection screen poses unique challenges. For instance, when projecting onto a portable screen at near normal angles, the viewer's head or shoulders may at times obscure the image. Projecting at an angle to the screen can avoid obstruction of the projection path, but often at the expense of image brightness. Furthermore, when using conventional flat reflective (e.g., white) surfaces, most of the light flux projected onto the surface misses the viewer's viewing cone via Lambertian scattering.

Described herein are systems and techniques for projecting content, periodically or continuously, onto a rear surface of a display medium. The rear projected image is presented on an opposing or front surface of the display medium to a human audience for viewing. In certain described implementations, the display medium is configured to display images for a finite amount of time, during which time the image decays until the image substantially or entirely disappears unless new light is projected onto the display medium. That is, the systems and techniques may project light onto the display medium, with the light energizing particles of the display medium to display a predefined image. Such display mediums may include phosphorescent material, fluorescent material, or a combination thereof.

In another example, the display medium may comprise an electronic paper display, such as an electrophoretic display, a Gyricon display, an electrowetting display, or any other display that mimics ink on paper. The electronic paper display may include multiple particles within respective capsules, as well as photocells associated with respective capsules. The photocells may receive light from a projector to charge the particles, thus moving the particles to appropriate positions within the capsules to collectively display the predefined image. In instances where the electronic paper display is monochromatic, the projector (or another projector) may project color pixels atop the electronic paper display, thus creating a full color image.

In one example, after a projector of the system projects light onto the display medium, the projector may cease the projecting, after which time the display medium will continue to display the image. Sometime thereafter, the projector may again project the light onto the display medium to re-energize the particles and cause the display medium to display the image with a greater intensity (given that the intensity of the image has decayed over the time during no projection has occurred). By periodically projecting the light, the system thus allows for display of an image without the need to continuously project onto the display medium. Furthermore, the projector may modulate the intensity of the image on the display medium by modulating the length of time and/or the intensity of the projection. For instance, the projector may increase the intensity of the image on the medium by increasing the intensity of the projected light.

In some instances, the display medium may include particles that are associated with respective different colors. For instance, a display medium may include particles associated with the colors red, green, and blue. As such, the projector may project different wavelengths of light, with each wavelength energizing one set of the particles (e.g., red, green, or blue). Therefore, projecting the multiple wavelengths of light may cause the display medium to display a color image.

The display medium is also configured to be pass non-visible light, such as infrared (IR) light. The non-visible light may be used to illuminate an area on the front side of the display medium to bounce off any objects in that area, such as features of the human. The reflected non-visible light can be captured by the projection system to detect human movement, gestures, and/or expressions. Such gestures may be used in the navigation and/or operation of the projection system. For instance, the IR light may be projected from the projection system, through the display medium, reflected off of a viewer's hand, and returned to the projection system for gesture recognition.

The systems and techniques may be implemented in many ways. One illustrative implementation is described below in which the projection system is implemented as part of an augmented relative environment within a room. However, the system may be implemented in many other contexts and situations in which images are projected onto screens for viewing consumption.

Illustrative Environment

FIG. 1 shows an illustrative environment 100 that may implement a system for projecting content, from the rear, onto a portable passive display medium 102. In this illustration, the environment 100 may be an augmented reality environment created within a scene, and hosted within an environmental area, such as a room of a house (e.g., bed room). An augmented reality functional node (ARFN) 104 is shown within the room. The ARFN 104 may contain projector(s), camera(s), and computing resources that are used to generate the augmented reality environment 100. In this illustration, the ARFN 104 is embodied as a table lamp shown mounted or positioned at the foot of a bed 106 to project images toward the back of a display medium 102. A viewer or user 108 is shown sitting up in the bed 106 and holding the portable display medium 102. Within the environment 100, other features may also be present, such as a window 110 and an overhead lighting fixture 112.

While FIG. 1 illustrates the medium 102 as portable, in some instances the medium 102 may be attached a surface (e.g., a wall), may comprise a paint or coating (e.g., a wall having been painted or coated with a phosphorescent material), or the like.

As shown beneath the room view in FIG. 1, a head 120 of the lamp-based ARFN 104 is enlarged to depict a few of the components arranged therein. In this implementation, the ARFN 104 is equipped with a projector 122 and an interaction detection assembly 124 arranged within the lamp head 120. The projector 122 projects images onto a back surface or side of the handheld display medium 102, opposite to a front surface or side facing the user 108. The projected images may be of any number of things, such as books, games (e.g., crosswords, Sudoku, etc.), news, magazines, movies, a browser or other computer applications, or the like. In this example, a book or magazine 126 pertaining to auto racing is shown projected onto the display medium 102. In this manner, the ARFN 104 provides rear projection capabilities to avoid interference or obstruction by the viewer with respect to the projection path.

The projector 122 may be implemented with any number of technologies capable of generating an image and projecting that image onto a surface. Suitable technologies include a digital micromirror device (DMD), liquid crystal on silicon display (LCOS), liquid crystal display, 3LCD, laser projector, and so forth. In some implementations, the ARFN may include a plurality of projectors to project images.

The viewer 108 may interact with the images being projected onto the display medium 102 and the interaction detection assembly 124 detects and analyzes the human interaction. The human interaction may be in the form of voice, other sounds (e.g., taps, whistles, etc.), gestures, facial expressions, other movement, and so forth. In FIG. 1, the interaction detection assembly 124 is configured to detect human gestures, as illustrated by the viewer's hand 128 being moved in front of the display medium 102. Various gestures—movement, swipe, orientation, and finger arrangement and so on—may be associated with different operations or navigation instructions.

The interaction detection assembly 124 includes an infrared (IR) device 130 to emit non-visible light 132. Examples of non-visible light include infrared light, ultraviolet light, and other light of particular wavelengths within the electromagnetic spectrum that is invisible to a human eye. The display medium 102 is configured to pass the non-visible IR light 132 so that the IR light 132 hits and reflects from the human hand 128. Some of the reflected IR light 132 is returned and captured by the ARFN 104 where it is converted to digital data and transferred internally to a gesture detection component 134. The gesture detection component 134 analyzes the received IR light data in an effort to recognize patterns indicative of pre-determined gestures made by the viewer's hand 128. One or more candidate gestures are identified based on the captured IR light data, and the candidate gestures are evaluated with respect to the context of the content being projected onto the projection screen 102. Once a statistically likely gesture is identified, the operation or navigation instruction associated with the gesture is executed.

For example, suppose the viewer 108 is reading an automobile magazine 126. The viewer 108 may turn the page by moving his right hand in a swiping motion from right to left. The gesture detection component 134 may recognize this action as anyone of multiple candidate gestures, such as a swiping action associated with page turning, an enlarging/minimizing motion associated with changing content size, and a circular movement associated with an instruction to play an in-magazine video clip. For discussion purposes, suppose the gesture detection component 134 assigns the highest statistical probability to the page turning swiping movement. As a result, the projector 122 begins projecting the next page on the display medium 102.

In addition or alternative to gesture detection, the ARFN 104 may be equipped with other components to detect human interaction. For example, the ARFN 104 may include one or more microphones to detect verbal input or other sounds, one or more speakers to output sound, and speech recognition technologies. These audio components enable voice interaction. As another example, the ARFN 104 may be equipped with a camera to capture other forms of user interaction, such as head movement, facial expression, environmental conditions, and so forth.

The lamp-based ARFN may be movable within a predetermined range such that the images projected onto the portable display medium 102 may be in focus. The lamp has an arm mechanism 136 to support the head 120 and facilitate universal movement of the head 120. Further, since in the illustrated example the display medium 102 may be moved by the user 108, the projector 120 in the ARFN 104 may be configured to track the display medium 102 during movement or rotation and project an image onto it for presentation. Tracking may be accomplished by recognizing the shape of the display medium 102, following optical targets disposed on the screen, and so forth.

It is noted that the ARFN may be embodied in other ways. For instance, the ARFN may be implemented as a fixed mount system that may be mounted within the room, such as to the ceiling, at the foot of the bed 106, although other placements are possible.

Associated with the ARFN 104 is a computing device 140, which may be located within the lamp structure, or within the augmented reality environment 100, or disposed at another location external to it. The ARFN 104 may be connected to the computing device 140 via a wired network, a wireless network, or a combination of the two. The computing device 140 has a processor 142, an input/output interface 144, and a memory 146. The processor 142 may include one or more processors configured to execute instructions. The instructions may be stored in memory 146, or in other memory accessible to the processor 142, such as storage in cloud-based resources.

The input/output interface 144 may be configured to couple the computing device 140 to other components, such as projectors, cameras, microphones, other ARFNs, other computing devices, and so forth. The input/output interface 144 may further include a network interface 148 that facilitates connection to a remote computing system, such as cloud computing resources. The network interface 148 enables access to one or more network types, including wired and wireless networks. More generally, the coupling between the computing device 140 and any components may be via wired technologies (e.g., wires, fiber optic cable, etc.), wireless technologies (e.g., RF, cellular, satellite, Bluetooth, etc.), or other connection technologies.

The memory 146 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 146 and configured to execute on a processor, such as the processor 142. An operating system module 150 is configured to manage hardware and services within and coupled to the computing device 140 for the benefit of other modules.

A spatial analysis module 152 may be optionally included and is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. The spatial analysis module 152 provides the information used within the augmented reality environment to provide an interface between the physicality of the scene and virtual objects and information.

One or more datastores 154 may be provided within the memory 146 or separate therefrom. Examples datastores include a system parameters datastore configured to maintain information about the state of the computing device 140, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

The systems parameters datastore may further include calibration metrics. For instance, the ARFN may be calibrated to define a depth field and an acceptable range of focal lengths. The calibration metrics may include anticipated distances from the projector to an expected position of the display medium 102. In the illustrated example, the ARFN 104 is known to be positioned near or at the foot of the bed 106. Further, it is anticipated that the display screen 102 will be held a little closer toward the head of the bed. Thus, the ARFN 104 may be calibrated so that the projection lenses provide images for depiction on the display screen when held within a range of say three to five feet from the projector. This 3-5 feet range would establish a depth of focus supported by the projection system of the ARFN 104.

In some implementations, a calibration table may be stored in the datastores 154 that hold the various calibration metrics for different depth of focus ranges. The table correlates various metrics (e.g., f-number, lens settings, etc.) with associated ranges.

Another example datastore 154 is an object parameters datastore configured to maintain information about the state of objects within the scene. The object parameters may include the surface contour of the object, overall reflectivity, color, and so forth. This information may be acquired from the ARFN, other input devices, or via a manual input and stored within the object parameters datastore.

Still another example datastore 154 is an object datastore configured to maintain a library of pre-loaded reference objects. This information may include assumptions about the object, dimensions, and so forth. For example, the object datastore may include a reference object of a beverage can and include the assumptions that beverage cans are either held by a user or sit on a surface, and are not present on walls or ceilings. The spatial analysis module 152 may use this data maintained in the datastore to test dimensional assumptions when determining the dimensions of objects within the scene. In some implementations, the object parameters in the object parameters datastore may be incorporated into the object datastore. For example, objects in the scene which are temporally persistent, such as walls, a particular table, particular users, and so forth may be stored within the object datastore. The object datastore may be stored on one or more of the memory of the ARFN, storage devices accessible on the local network, or cloud storage accessible via a wide area network.

An augmented reality module 156 is configured to generate augmented reality output in concert with the physical environment. The augmented reality module 156 may employ essentially any surface, object, or device within the environment 100 to interact with the users. The augmented reality module 156 may be used to track items within the environment that were previously identified by the spatial analysis module 152. The augmented reality module 156 includes a tracking and control module configured to track one or more items within the scene and accept inputs from or relating to the items.

In addition, the memory 146 may include a gesture module 158 that uses various capabilities of the ARFN 104 to detect and recognize gestures or other actions made by the viewer 108 in the environment 100. The gesture module 158 may perform the IR light data and/or various types of image processing, including three-dimensional environment analysis, to detect gestures. The gesture module 158 may further analyze gestures to identify multiple possible candidate gestures, and then determine a most statistically probable gesture within the context. Data indicative of detected gestures may be compared to stored gesture data in datastores 154 to identify the candidate gestures.

The memory 144 may also include a facial recognition module 160 to recognize facial characteristics for identification and authentication purposes, as well as facial expressions for human feedback.

These various modules implemented by the computing device 104, as well as other modules not shown, may be configured collectively to perform the techniques described herein for rear projection of images onto a display screen and recognizing user gestures made on an opposing side of the screen. The ARFN 104 may include various interface components, such as user interface components and other components, which may be used to detect and evaluate conditions and events within the environment 100. The interface components may in certain implementations include various types of sensors and transducers, content generation devices, and so forth.

Example Passive Display Screen

Figure 2:
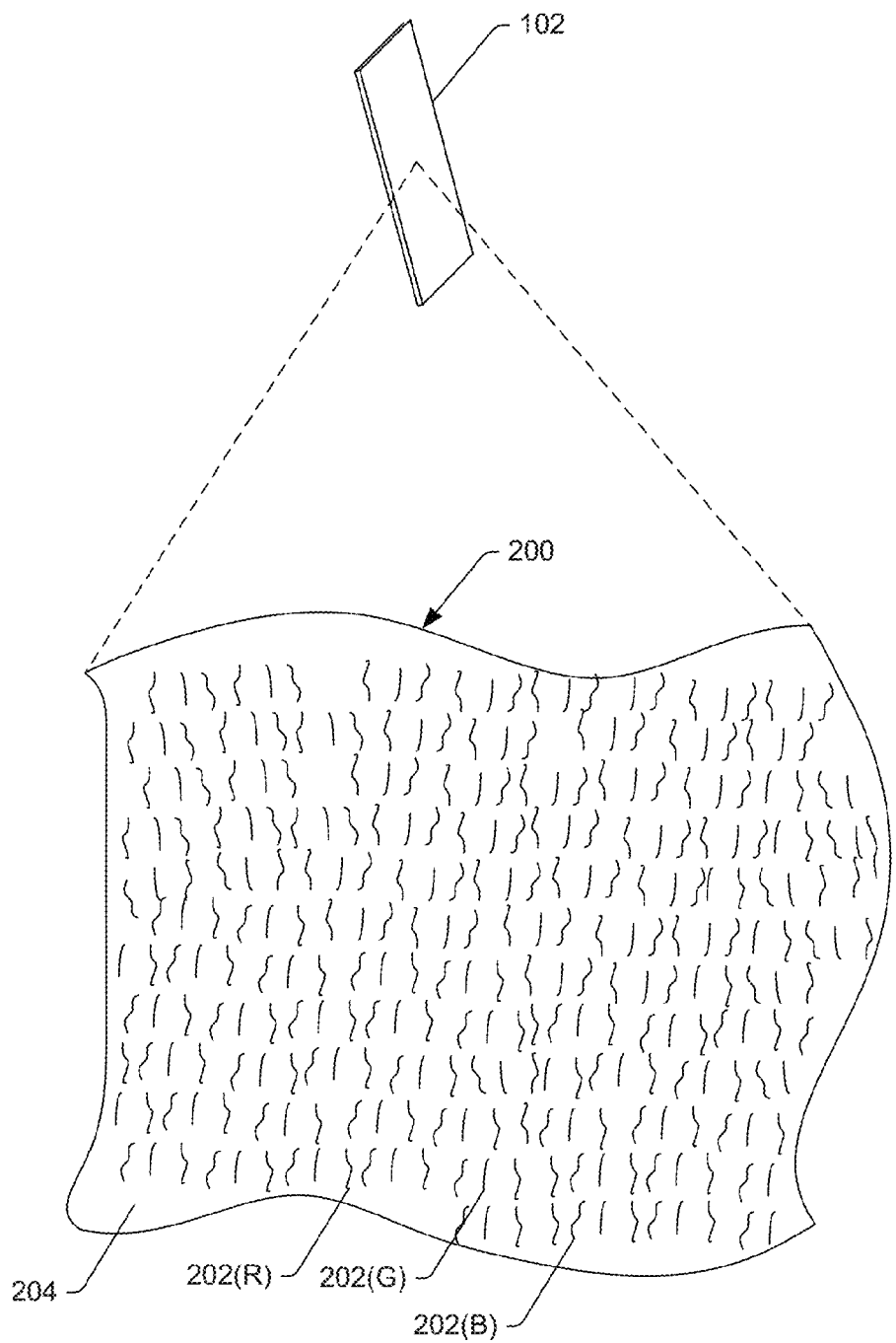
FIG. 2 illustrates one example implementation of the portable, rear projection, passive display screen of FIG. 1.

FIG. 2 illustrates an example implementation of a handheld, passive, rear projection display screen or medium 102. The display medium 102 illustrated in the example implementation is an entirely passive, non-electric device. That is, the display medium 102 may be free from a power supply to power the display medium, such as a battery, a connection to an electrical socket, or the like.

The display medium 102 may comprise a material formed of one or more layers that are collectively designed to diffuse visible light or otherwise present images thereon while simultaneously passing non-visible IR light for gesture detection. In one implementation, the display medium 102 may include phosphorescent material, fluorescent material, or a combination thereof.

In this illustration, a small portion 200 of the display medium 102 is shown enlarged to depict nano particles 202 formed in a transparent material (e.g., glass or plastic) 204. The nano particles may be formed of a phosphorous material and/or a fluorescent material. For purpose of ongoing discussion, the nano particles are described as nano-phosphorous elements 202, which can be activated or energized by energy emission in the form of projected light wavelengths. In one implementation, the projector 122 projects three different wavelengths that energize respective phosphorous elements 202 to emit three color variations, such as red-green-blue (RGB). In some cases, an ultraviolet may be used in place of red to further differentiate red wavelengths from IR, which is intended to pass through the material.

With reference to FIG. 2, suppose certain elements 202(R) are designed to emit a red color when energized by light projected by the projector 122 at a first wavelength. Second elements 202(G) are designed to emit a green color when energized by light projected by the projector 122 at a second wavelength. And third elements 202(B) are designed to emit a blue color when energized by light projected by the projector 122 at a third wavelength. The elements are designed to emit light for a finite period of time even after the projected light is ceased. In this manner, the display medium possesses a semi-persistent characteristic where the image remains for at least some finite period after the light is stopped.

The nano-phosphors fibers of varying color groups may be placed in the same transparent plane, or in individual layers that form the display medium 102. Depending upon the strength and properties of the transparent material, the display medium 102 may be sufficiently rigid without any additional framing or other structural members. Alternatively, a frame may be used to provide structural rigidity.

One suitable material that may be used in the passive display medium is sold under the name Emissive Projection Displays or Superimaging™ brand displays by Sun Innovations Inc. of Silicon Valley, Calif. The emissive projection display (EPD) includes a projector module that projects "latent" images of selective optical wavebands and a transparent fluorescent screen that converts the projected "latent" images to corresponding highly visible emissive images.

In other implementations, a volumetric display may be used as the display medium 102. The volumetric display is a graphical display device that forms a visual representation of an object in three physical dimensions, as opposed to the planar image. In one approach, these display screens have a rotating flat screen onto which images are projected. The rotating screen renders a three dimensional image via emission, scattering, or relaying of illumination from well-defined regions in space.

Figure 3:
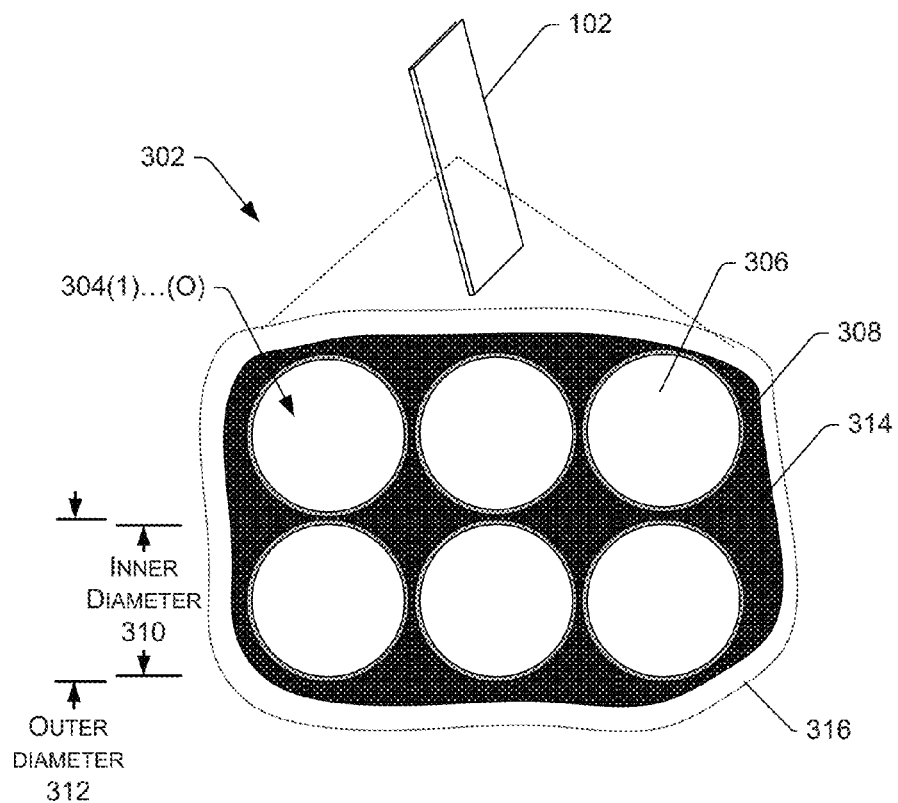
FIG. 3 illustrates another example implementation of the portable, rear projection, passive display screen of FIG. 1. This display screen employs optical waveguides.
Figure 3:
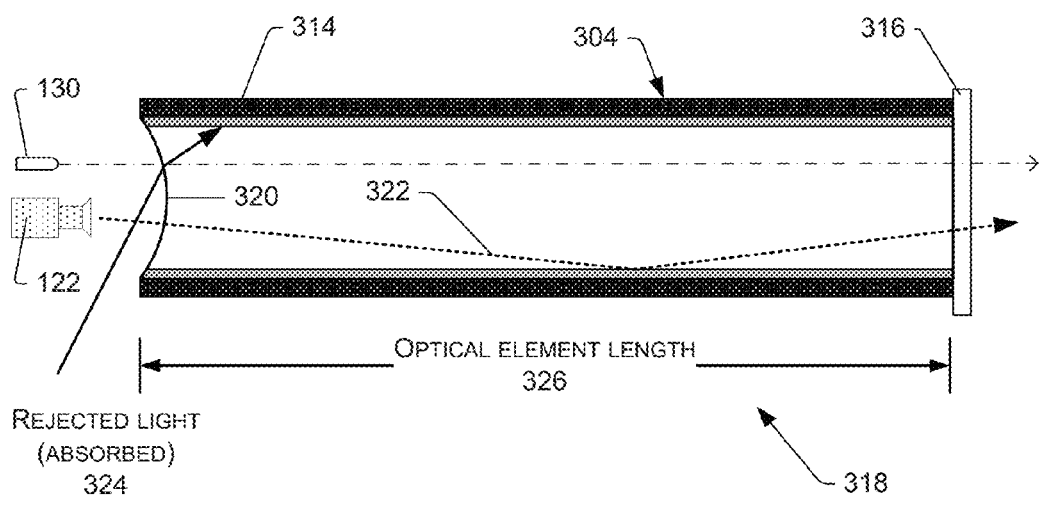

FIG. 3 illustrates an example implementation of a handheld, passive, rear projection display screen or medium 102. Like the implementation of FIG. 2, the display medium 102 shown in FIG. 3 is an entirely passive, non-electric device.

FIG. 3 illustrates a top view 302 of an enlarged portion of the display medium 102. A plurality of optical elements 304(1), 304(2), . . . , 304(O) are arranged on the display medium, such as in a matrix of linear rows and columns, although other patterns may be used. The optical elements 304(1)-(O) form optical waveguides that conduct light and may include, but are not limited to, optical fibers as shown here.

Each optical fiber of an element 304 comprises a core 306 surrounded by a thin cladding 308. The core 306 may be formed of a light conducting material, such as glass, plastic, crystalline material, and so forth. When the optical elements 304 comprise optical fibers, the refractive index of the core 306 may be about 1.589 while the refractive index of the cladding 308 is about 1.517.

The optical elements 304(1)-(O) may be sized such that their width or diameter is equal to or less than a minimum width of a projected pixel. In the example shown here, an inner diameter 310 of the core 306 may be about 94 microns, while an outer diameter 312 of the surrounding cladding 308 may be about 100 microns. Accordingly, individual optical elements 304(1)-(O) are about 100 microns, although they may be smaller.

The optical elements 304 may be held in place or distributed within a matrix configured as an optical absorber 314. The optical absorber 314 is configured to be highly absorptive of visible light frequencies. For example, the optical absorber 314 may comprise black glass, carbon black, or a dark pigment. The matrix may aid in maintaining the optical elements in a generally parallel arrangement with one another.

Behind the optical elements 304 is a light transmissive layer 316, which is optically coupled to the optical elements 304, and is configured to pass both visible and non-visible (e.g., IR) light frequencies. For example, in some implementations, the transmissive layer 316 may comprise a glass or a plastic.

Each optical element 304 is elongated, extending outward from the light transmissive layer 316. FIG. 3 illustrates a side view 318 of one optical element 304. The rear projected light from the projector 122 enters the optical element 304 via an input deflector 320 disposed at the entrance or front of the optical element 304. The input deflector 320 is configured to alter a direction of incident light, and prevents an input angle from matching an exit angle. As shown here, the input deflector 320 may comprise a concave feature present in the optical element 304. For example, an optical fiber may be ground or etched to produce the described concavity. The radius of curvature of the concavity of the input deflector 320 may vary. In the implementation shown, the radius of curvature is about 167 microns. In some implementations, the input deflector 320 may comprise a plano-concave lens optically coupled to the front of the optical element 304. In another implementation, a plurality of optically refractive elements may be used, such as glass or plastic beads. Further, in still other implementations, the end of the optical element may be flat without an input deflector feature.

As shown here, projected light 322 incident on the optical element 304 enters the input deflector 320 and undergoes a change in direction. The light continues down the optical element 304 by internal reflection, reaches the light transmissive layer 316, and is dispersed or scattered for presentation of the rear projected image to the viewer. In contrast, incoming light 324 incident on the optical element 304 at a more acute angle enters the input deflector 320, but fails to transfer down the optical element 304 via internal reflection. Instead, the light is readily absorbed by the optical absorber 314 and hence rejected in that it is not reflected out from the optical element 304.

The IR light emitted by the IR device 130 is also transferred down the optical element 304, either directly or through internal reflection, and passes out through the light transmissive layer 316. The transmissive layer 316 passes the IR energy spectrum without disruption so that the IR light can be used to detect user gestures. Reflected IR light also passes back through the transmissive layer 316 and the optical element 304 to the gesture detection component 134 (not shown in FIG. 3).

The optical element 304 has a length 326 from front to the light transmissive layer 316. In one implementation, the length 326 may be a multiple of about five to ten times the outer diameter 312. In another implementation, the length 326 may be at least ten times the outer diameter 312. The optical element length 326 may vary between optical elements 304 within the screen.

Figure 4:
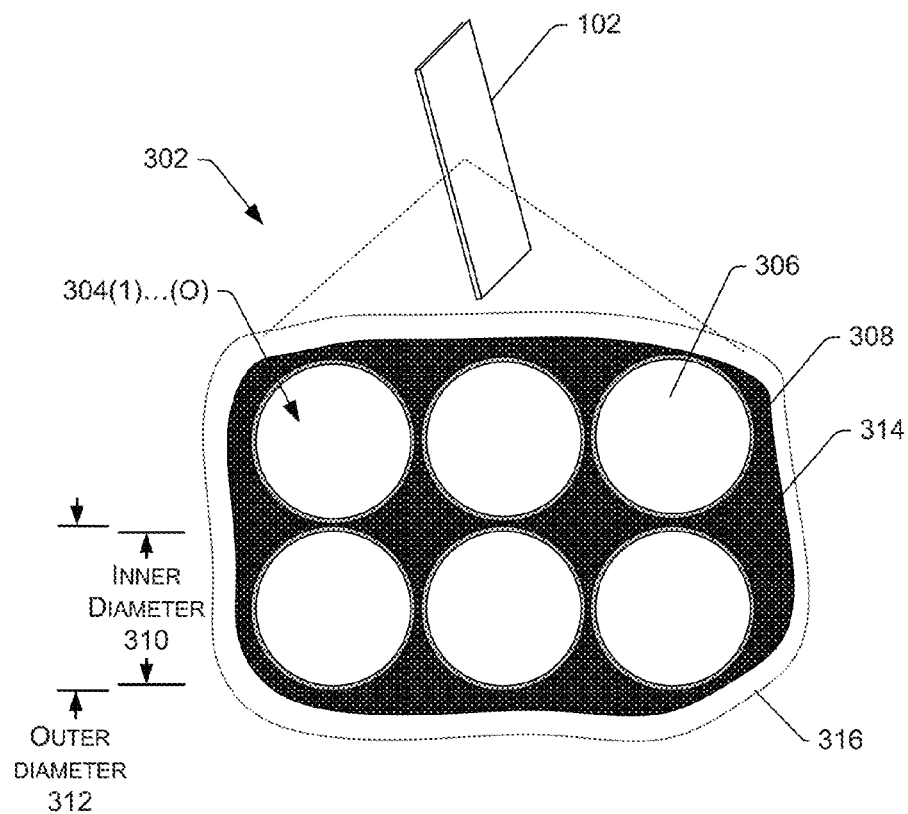
FIG. 4 illustrates still another example implementation of the portable, rear projection, passive display screen of FIG. 1, which employs arrays of opposing optical waveguides.
Figure 4:
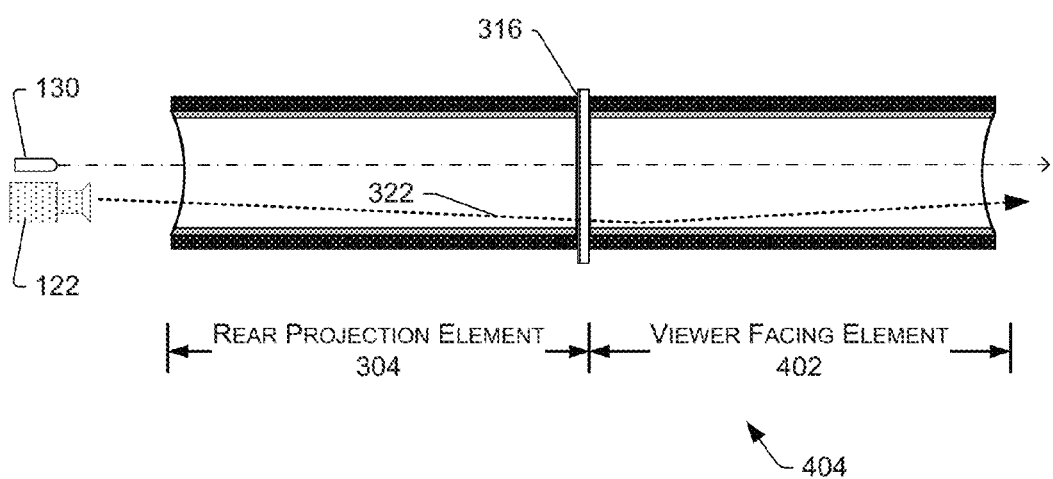

FIG. 4 shows yet another example implementation of a handheld, passive, rear projection display screen or medium 102. It is similar to that shown in FIG. 3, but further includes a mirror set of optical elements 402 on the viewer facing side of the display medium 102, as shown in the side view 404. In this implementation the viewer facing element 402 extends outward from the light transmissive layer 316 toward the viewer. The rear projection optical elements 304 and the viewer facing elements 402 may have identical dimensions (length, cross-sectional area, etc.) or differing dimensions. For instance, the viewer facing elements 402 may have a different length than its corresponding rear projection elements 304.

The FIG. 4 implementation provides some additional advantages in that off-angle light incident on the viewer facing surface of the display medium 102 is absorbed. That is, ambient light from a room lighting source or a window is absorbed or otherwise minimized. As a result, the rear projected image appears brighter to the viewer.

Illustrative Process

Figure 5:
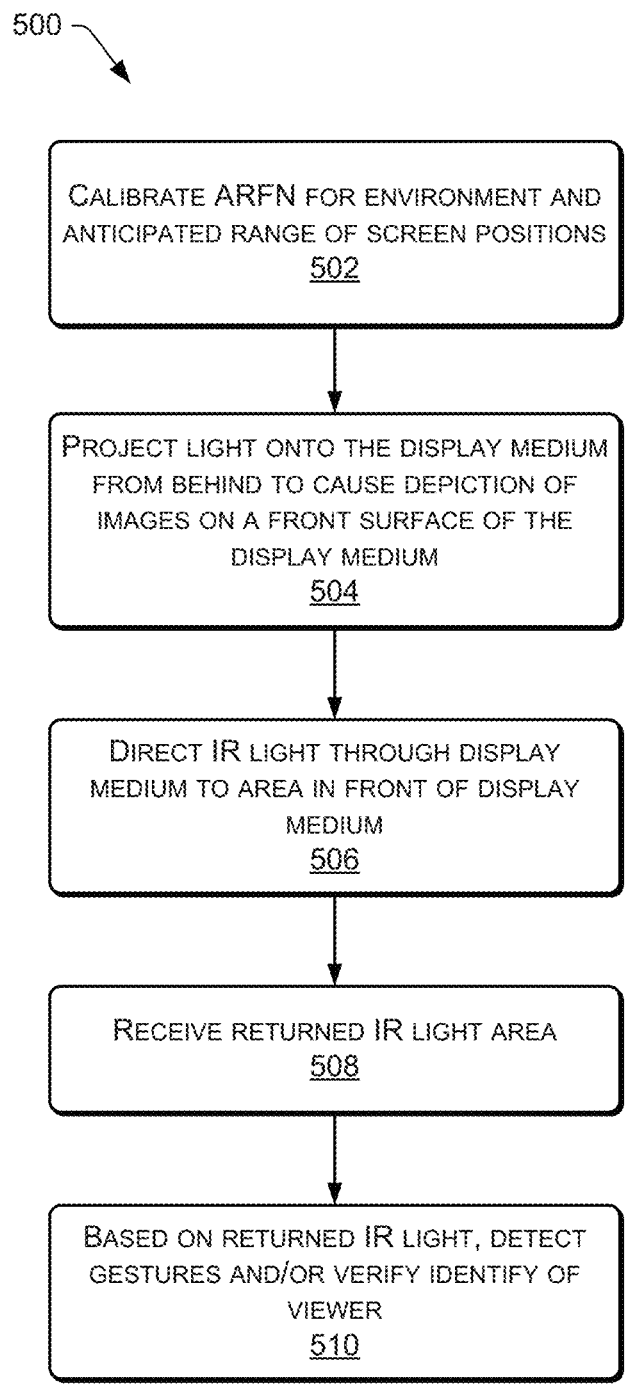
FIG. 5 is a flow diagram of an example process to operate projection system and passive screen of FIG. 1.

FIG. 5 is a flow diagram of an example process 500 to operate projection system and passive display medium. This process is illustrated as a collection of blocks in a logical flow graph, each operation of which represents a sequence of operations that can be implemented by the display medium, and hardware and/or software implemented by the ARFN. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

At 502, the process 500 may involve calibration of the ARFN for use in an environment and anticipated range of screen positions. For instance, the ARFN 104 may be mounted or positioned at a particular location in a room, such as at the foot of a bed as shown in FIG. 1. At this location, the system may further be calibrated to know roughly where the user is likely to hold the portable display medium. If the user plans to read or watch movies in bed, for example, the ARFN 104 may be calibrated to project images approximately 3-5 feet from the foot of the bed, and might focus the projection lens for a 4 foot expectation.

At 504, light is projected from behind onto a back or rear surface of the display medium. The projected light is effective to cause depiction of images on a front surface, opposite to the read surface. In certain implementations, the light contains visible images that are diffused by the display medium for observation by the viewer. In other implementations, the projector projects at least three different light wavelengths to energize nano phosphors held in the display medium to depict three corresponding colors. In still other implementations, the projected image is convey through passive optical elements that accept rear projected light from the projector while rejecting other off-angle light.

At 506, non-visible light is directed through the display medium to an area in front of the display medium. The non-visible light may be IR light. The IR light passes through the display medium, without being diffused, and is reflected upon impact on objects or the viewer.

At 508, part of the IR light reflected from objects and/or the viewer is captured by the ARFN.

At 510, the captured IR light is analyzed to determine whether there is an indication of a user gesture and/or to verify an identity of the viewer. In the case of gesture, human movement may be interpreted as one or more gestures. Accordingly, the ARFN identifies possible candidate gestures, evaluates each gesture to select a most statistically probably candidate, and then implements the most likely candidate. In the case of verification, the IR light may be directed at the viewer's face, with reflected IR light being indicative of the facial shape and characteristics that may be used for viewer authentication.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a device comprising:
a processor;
a projector; and
a light emitter configured to emit non-visible light;
a display medium that is physically separate from the device, the display medium configured to:
receive images projected onto a rear surface of the display medium by the projector, causing the images to be displayed for viewing on a front surface of the display medium at a first brightness level, and
allow non-visible light directed to the rear surface of the display medium to pass, at least in part, through the display medium to an environment in front of the front surface of the display medium; and
the device further comprising one or more computer-readable media storing computer-executable instructions that, when executed by the processor, cause the processor to perform acts comprising:
determining that the image has decreased from the first brightness level to a second brightness level that is less than the first brightness level;
based at least partly on the image decreasing from the first brightness level to the second brightness level, causing an additional instance of the image to be projected onto the rear surface of the display medium;
detecting, based at least in part on an interaction of a user of the display medium with the non-visible light passed through to the environment, one or more gestures made by the user;
determining one or more operations to be performed based on the one or more gestures; and
performing at least one operation of the one or more operations.

2. The system as recited in claim 1, wherein the display medium comprises:
a first layer that allows the non-visible light to pass through at least in part; and
nano particles within the first layer, the nano particles being formed of at least one of phosphorescent material or fluorescent material to emit one or more colors of light in response to receiving the images projected from the projector.

3. The system as recited in claim 1, wherein the display medium comprises a plurality of passive optical elements on a first layer, the plurality of passive optical elements configured to receive the images projected by the projector to the rear end of the display medium and cause the images to be displayed for viewing on the front surface of the display medium.

4. The system as recited in claim 1, wherein the light emitter is an infrared (IR) device configured to emit IR light.

5. The system as recited in claim 1, wherein the projector projects light having a plurality of different wavelengths, wherein a first wavelength of the plurality of wavelengths causes a first color to be displayed on the display medium and a second wavelength of the plurality of wavelengths causes a second color to be displayed on the display medium.

6. A system comprising:
a passive display medium having a front surface and a rear surface, the passive display medium configured to:
depict images on the front surface, and
allow non-visible light directed to the back surface to pass, at least in part, through the passive display medium to an environment in front of the front surface of the passive display medium;
a projector, that is physically separate from the passive display medium, to:
project images to the rear surface of the passive display medium, the images that are projected causing the images to be displayed for viewing on the front surface of the passive display medium at a first brightness level that decreases over time; and
based at least partly on a determination that the first brightness level has decreased to a second brightness level, project an additional instance of the images to the rear surface of the passive display medium; and
an interaction detection component configured to detect and interpret human interaction with the non-visible light passed through to the environment.

7. The system as recited in claim 6, wherein the passive display medium comprises particles to emit one or more colors of light in response to receiving the images projected from the projector to create the images to be displayed on the front surface.

8. The system as recited in claim 6, wherein the passive display medium comprises at least one of phosphorescent material or fluorescent material.

9. The system as recited in claim 6, wherein the passive display medium comprises:
a first material to allow the non-visible light to pass through at least in part; and
nano particles within the first material, the nano particles being formed of at least one of phosphorescent material or fluorescent material to emit one or more colors of light in response to receiving the images projected from the projector.

10. The system as recited in claim 9, wherein the one or more colors comprise blue, green and one of red or ultra violet.

11. The system as recited in claim 6, wherein the passive display medium comprises:
a first layer;
a plurality of first optical elements on the rear surface to receive the light information from the projector; and
a plurality of second optical elements on the front surface of the display medium to present the images.

12. The system as recited in claim 6, wherein the interaction detection component is configured to recognize facial expressions of a user of the passive display medium.

13. The system as recited in claim 6, wherein the interaction detection component comprises an infrared (IR) device to direct IR light through the passive display medium and onto the environment.

14. The system as recited in claim 6, wherein the interaction detection component comprises:
an infrared (IR) device to direct IR light through the passive display medium and onto the environment; and
a gesture detection component to determine gestures made by a user located in the environment based at least in part on detecting IR light scattered from the environment.

15. The system as recited in claim 14, wherein the gesture detection component is further configured to at least one of recognize facial expressions or authenticate the viewer.

16. The system as recited in claim 6, wherein the interaction detection component comprises a gesture detection component to detect gestures made by a user located in the environment and to determine at least one operation to be performed based on the gesture.

17. The system as recited in claim 6, wherein the interaction detection component comprises one or more microphones to detect sound.

18. A method comprising:
- projecting, by a device, light onto a rear surface of a display medium that, upon receiving the light, is configured to display an image on a front surface of the display medium;
- directing, by the device, non-visible light at least in part through the display medium to an environment in front of the front surface of the display medium;
- based at least partly on an expiration of a pre-determined period of time, projecting an additional instance of the light onto the rear surface of the display medium; and
- detecting, by the device and based at least in part on an interaction of a user of the display medium with the non-visible light passed through to the environment, one or more gestures made by the user.

19. The method as recited in claim 18, wherein the display medium comprises a passive display medium having a plurality of passive optical elements.

20. The method as recited in claim 18, wherein the display medium comprises at least one of phosphorescent material or fluorescent material.

21. The method as recited in claim 18, wherein the display medium comprises an electronic paper display.

22. The method as recited in claim 18, further comprising ceasing projection of the non-visible light, wherein the display medium is configured to display the image for a finite amount of time upon ceasing projection.

* * * * *